United States Patent [19]
Arndt et al.

[11] Patent Number: 5,395,444
[45] Date of Patent: Mar. 7, 1995

[54] FINGERPRINT INK DISPENSER

[75] Inventors: Douglas C. Arndt, Thousand Oaks; Bruce H. Gindelberger, San Diego, both of Calif.

[73] Assignee: Identicator Corporation, San Bruno, Calif.

[21] Appl. No.: 29,106

[22] Filed: Mar. 10, 1993

[51] Int. Cl.⁶ .................. B41K 1/00; B05C 11/00; C09C 1/48
[52] U.S. Cl. .................. 118/31.5; 118/264; 118/268; 118/270; 106/477
[58] Field of Search ............ 118/31.5, 264, 268, 118/270; 427/1; 106/477

[56] References Cited

U.S. PATENT DOCUMENTS

| | | | |
|---|---|---|---|
| 2,500,612 | 3/1950 | Krogh | 118/31.5 |
| 3,075,852 | 1/1973 | Bonora | 118/31.5 |
| 3,709,524 | 1/1973 | McKee et al. | 118/31.5 |
| 4,226,740 | 10/1980 | Worsham et al. | 252/408 |
| 4,262,623 | 4/1981 | Smith, III et al. | 118/31.5 |
| 4,379,178 | 4/1983 | Meadows et al. | 118/31.5 |

OTHER PUBLICATIONS

Perrys Chemical Engineer's Handbook, Sixth Edition, McGraw-Hill Book Company, 1984.

*Primary Examiner*—W. Gary Jones
*Assistant Examiner*—Steven P. Griffin
*Attorney, Agent, or Firm*—Harold L. Jackson

[57] ABSTRACT

A fingerprint ink dispensing apparatus includes a ceramic disk positioned over an ink reservoir in the form, for example, of a felt pad. The ceramic disk has an average porosity of about 40% and an average pore size of about 5 microns. A colored pigment such as carbon black dispensed in a hydrocarbon oil is disposed in the reservoir with the concentration of the carbon black being about 22% by weight and the diameter of the carbon black particles falling within the range of 0.15 to 0.60 microns and the average size being about 0.35 microns.

20 Claims, 1 Drawing Sheet

FINGERPRINT INK DISPENSER

BACKGROUND OF THE INVENTION

1. Field of the Invention

The present invention relates to fingerprint ink dispensing apparatus and more particularly to a combined ink pad and reservoir.

2. Description of the Prior Art

The art of fingerprinting and identifying persons by their fingerprints is well known. The simplest method of taking a person's fingerprints is to apply a highly colored ink or dye (hereinafter collectively referred to as "ink") such as a suspension of carbon black particles to the person's fingertips. Subsequent rolling or pressing of the person's fingers on a clean recording surface, such as paper, deposits the ink on the surface in a pattern corresponding to the fingerprints of the person.

To obtain clear prints standard ink is generally squeezed from a tube onto a plate and then rolled to an appropriate thickness. It, of course, takes time to prepare an ink plate. Moreover, if the solvent and pigment separate (which often occurs) additional time is required for the technician to re-mix the constituents on the plate. In addition, it is not unnatural for a person to vary the ink thickness on the plate when rushed etc., with the result that the resulting prints are smeared (too much ink) or too faint (too little ink).

A rigid plate made of ceramic and disposed over a felt reservoir has also been used to apply ink to the fingertips. The ceramic plate had a porosity of between 30% to 35% with an average pore size of about 5 microns in diameter. The ink consisted of carbon black pigment dispensed in a glycerol/glycol/water base with a 22% by weight concentration of the pigment. The average diameter of the pigment particles was about 0.35 microns with the diameter of substantially all of the pigment particles falling within the range of 0.15 to 0.60 microns. This system eliminated the ink plate and the human variables associated with the use of such a plate. However, problems of fingerstaining and penetration rate into the paper (too slow) still existed to some extent. In addition, the ink solution had stability problems. To solve these problems, the glycerol dispersant was replaced with a hydrocarbon based oil and the concentration of the carbon black pigment was reduced to about 14% by weight.

The change of dispersant and pigment concentration, however, resulted in fingerprint images which remained light in contrast and tended to bleed, i.e., the lines of the image broadened and became fuzzy in appearance. These new problems became particularly acute when the recorded prints were read and compared by computerized machines.

The present invention is aimed at solving the above problems.

SUMMARY OF THE INVENTION

In accordance with the present invention an ink pad housing having an open top, a closed bottom and an upstanding peripheral wall is provided with a reservoir area e.g., in the form of a felt pad, along the bottom. A ceramic disc or plate is juxtaposed over the reservoir and substantially sealed to the peripheral wall of the housing so that ink flowing from the reservoir must travel through the ceramic plate. The ceramic plate is constructed to have an average porosity within the range of 40% to 50% and an average pore size of about 5 microns in diameter. The reservoir contains an ink comprising a colored pigment, such as carbon black, dispersed in a hydrocarbon based oil with the pigment having an average particle diameter of about 0.35 microns. The diameter of substantially all of the pigment particles fall within the range of about 0.15 to 0.60 microns with the concentration of the pigment falling within the range of 15% to 30% by weight.

The present invention may best be understood by reference to the following description taken in conjunction with the accompanying drawings.

DESCRIPTION OF THE PREFERRED EMBODIMENT

Figure 1:
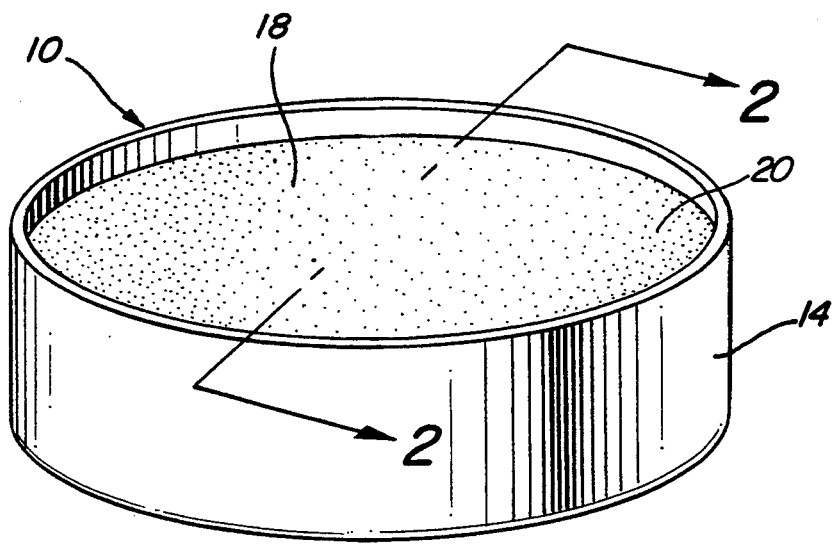
FIG. 1 is a perspective view of an ink dispenser in accordance with the present invention.
Figure 2:
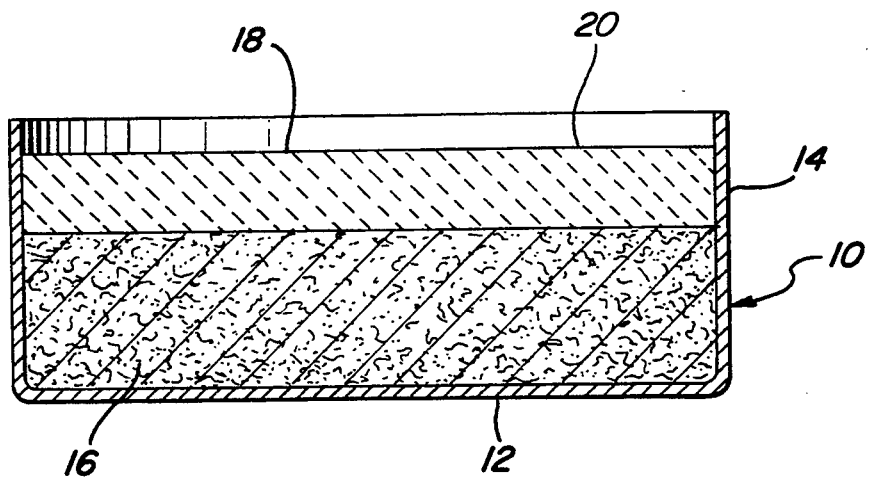
FIG. 2 is a cross-sectional view of the dispenser of FIG. 1.

Referring now to the drawings a housing 10 is formed with a bottom wall 12 and an upstanding peripheral wall 14. The housing is open at the top to provide access to an ink dispensing plate to be described. The housing may be provided with a removable top or cover (not shown) to inhibit the accumulation of dust on the top of the ink dispensing plate.

An ink reservoir 16 preferably comprises a resilient foam, spongy or like material having interconnected interstitial spaces wherein the volume of the void within the structure is relatively large. A preferred reservoir 16 comprises a felt pad. Alternatively, the reservoir may comprise a ceramic or plastic substrate (i.e., plate) having a high porosity (e.g., 50%–75% with an average pore size in the neighborhood of about 10–100 microns in diameter). The plastic substrate may be made of polyethylene A rigid porous ceramic plate or disc 18 is positioned over and in intimate contact with the reservoir 16 and substantially sealed against the peripheral wall 14 so that liquid flowing from the reservoir must travel through the ceramic plate. The thickness of the ceramic plate is preferably within the range of about 2/16" to ⅜" in thickness and most preferably about ¼" in thickness.

The reservoir is soaked or saturated with an ink comprising a colored pigment, such as carbon black, dispersed in a hydrocarbon based oil carrier such as an aliphatic hydrocarbon oil, e.g., mineral oil, vegetable oil etc.

The viscosity of the oil is preferably about 35 cps at 25° C., however, the viscosity may be somewhat higher or lower.

The pigment is preferably carbon black having an average particle size (diameter) of about 0.35 microns with the diameter of substantially all of the pigment particles falling within the range of about 0.15 to 0.60 microns.

The concentration of pigment is within the range of 15% to 30% by weight of the total solution and preferably about 22% by weight.

An exemplary list of ingredients of the ink is as follows:

|                      | % by weight |
|----------------------|-------------|
| Carbon Black Pigment | 22          |
| Paraffinic Mineral Oil | 20        |
| Dispersant           | 2           |
| Naphthenic Mineral Oil | 56        |

The product is made by grinding and dispersing the pigment in the paraffinic oil with the dispersant until a sub-micron dispersion of the pigment is obtained. The dispersion is then blended slowly with naphthenic oil until the proper viscosity is obtained.

The viscosity and surface tension of the finished ink are as follows:

| Viscosity in cps | 400 +/− 50 |
|------------------|------------|
| Surface Tension  | 33 +/− 3   |
| Specific Gravity | .938 +/− .005 |

The boiling point of the ink is preferably greater than 288° C. with an evaporation rate of less than 0.01 as compared to 1.0 for water. The vapor pressure and flash point of the ink is preferably less than 1.0 mm Hg at 20° C. and 149° C. (Cleveland open cup).

The ceramic plate has an average porosity within the range of 40% to 50% and preferably about 40% with an average pore size of about 5 microns in diameter.

The ink solution due to capillary action, rises through the ceramic plate to the surface 20. On the surface it is available for delivery to the finger tips of a person to be fingerprinted. The ceramic plate results in the delivery of the requisite and correct amount of ink to the fingers substantially independently of the pressure exerted by the fingers upon the plate. The amount of ink to be applied by the fingertips is objectively determined (as compared with the ink plate technique). The increase in the pigment concentration improves the contrast and reduces the tendency of the ink to wick as compared with the prior art ceramic pad/ink dispensers.

The increased porosity of the ceramic pad inhibits the clogging tendency of the pigment.

Figure 3:
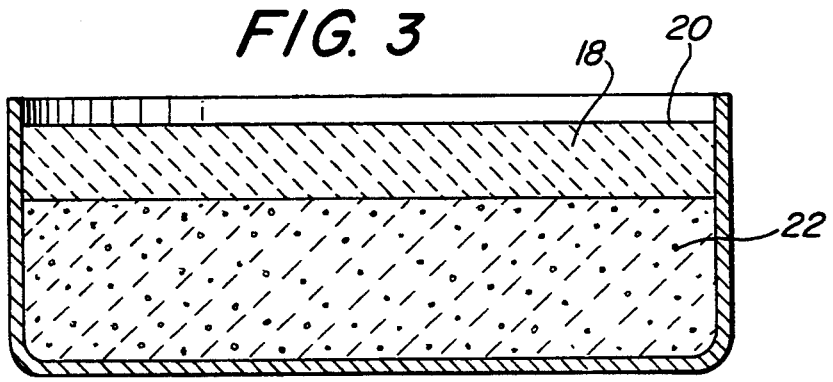
FIG. 3 is a cross-sectional view of an alternative embodiment of the invention.

Referring now to FIG. 3, there is illustrated the alternative embodiment discussed earlier wherein the reservoir is formed by a high porosity and pore size ceramic plate 22.

An improved ink dispensing apparatus has thus been described. Various modification will be apparent to those skilled in the art without involving any departure from the spirit and scope of the invention as defined in the appended claims. For example, a separate ink reservoir may not be necessary where the ink dispensing plate has a sufficient thickness to hold enough ink to yield the desired number of prints between refill operations. Also, a porous plastic ink dispensing plate, made for example of polyethylene, having an average porosity within the range of about 7% to 10% (preferably about 8.5% to 9%) and an average pore size of about 5 microns in diameter may be used in lieu of the ceramic plate 18. Such a plastic ink dispensing plate may be made very thin i.e. of the order of 0.100 inches.

What is claimed is:

1. Fingerprint ink dispensing apparatus comprising:
   a housing having an open top, a closed bottom and an upstanding peripheral wall;
   reservoir means positioned on the bottom of the housing for receiving an ink to be dispensed;
   a ceramic plate positioned within the housing and in intimate contact with the reservoir means and the peripheral wall of the housing so that ink flowing from the reservoir means must travel through the ceramic plate, the ceramic plate having an average porosity within the range of about 40% to 45% and an average pore size of about 5 microns in diameter; and
   an ink disposed within the reservoir, the ink comprising a colored pigment dispersed in a hydrocarbon based oil, the pigment having an average particle diameter of about 0.35 microns with the diameter of substantially all of the pigment particles falling within the range of about 0.15 to 0.60 microns, the concentration of the pigment being of about 22% to 30% by weight.

2. The invention of claim 1 wherein the reservoir means comprises a resilient spongy like material with interstitial spaces.

3. The invention of claim 2 wherein the reservoir means comprises a felt pad.

4. The invention of claim 1 wherein the average porosity of the ceramic plate is about 40%.

5. The invention of claim 4 wherein the oil consists primarily of an aliphatic hydrocarbon oil.

6. The invention of claim 5 wherein the primary ingredient of the oil is a mineral oil.

7. The invention of claim 5 wherein the viscosity of the ink is about 400±50 cps at 25° C.

8. The invention of claim 10 wherein the specific gravity of the ink is about 0.938±0.005 at 25° C.

9. The invention of claim 8 wherein the pigment is carbon black and the oil comprises paraffinic mineral oil and naphthenic mineral oil.

10. The invention of claim 9 wherein the paraffinic mineral oil and naphthenic mineral oil comprise about 20% and 56% by weight, respectively, of the ink.

11. The invention of claim 1 wherein the concentration of the pigment is about 22% by weight.

12. The invention of claim 11 wherein the pigment is carbon black.

13. The invention of claim 11 wherein the reservoir means comprise a second ceramic plate, the second ceramic plate having a porosity within the range of about 50% to 75% with an average pore size within the range of about 10 to 100 microns in diameter.

14. The invention of claim 11 wherein the reservoir means comprises a plastic plate, the plastic plate having a porosity within the range of about 50% to 75% with an average pore size within the range of about 10 to 100 microns.

15. Fingerprint ink dispensing apparatus comprising:
   a housing having an open top, a closed bottom and an upstanding peripheral wall;
   a ceramic plate positioned within the housing and in intimate contact with the peripheral wall of the housing, having an average porosity within the range of about 40% to 45% and an average pore size of about 5 microns in diameter; and
   an ink disposed within the ceramic plate, the ink comprising a colored pigment dispersed in a hydrocarbon based oil, the pigment having an average particle diameter of about 0.35 microns with the diameter of substantially all of the pigment particles falling within the range of about 0.15 to 0.60 microns, the concentration of the pigment being about 22% by weight.

16. The invention of claim 15 further including a reservoir means disposed under the ceramic plate.

17. The invention of claim 16 wherein the reservoir means comprises a felt pad.

18. The invention of claim 17 wherein the average porosity of the ceramic plate is about 40%.

19. The invention of claim 18 wherein the pigment is carbon black.

20. The invention of claim 19 wherein the primary ingredient of the oil is a mineral oil.

* * * * *

UNITED STATES PATENT AND TRADEMARK OFFICE
CERTIFICATE OF CORRECTION

PATENT NO. : 5,395,444
DATED : March 7, 1995
INVENTOR(S) : Douglas C. Arndt and Bruce H. Gindelberger It is certified that error appears in the above-identified patent and that said Letters Patent is hereby corrected as shown below:

Column 4, line 30, "10" should read --7--.

Signed and Sealed this

Sixth Day of June, 1995

Attest:

BRUCE LEHMAN

*Attesting Officer*    Commissioner of Patents and Trademarks